Jan. 17, 1939.  F. STRECKER  2,144,036
AMPLITUDE LIMITING DEVICE
Filed Sept. 5, 1936
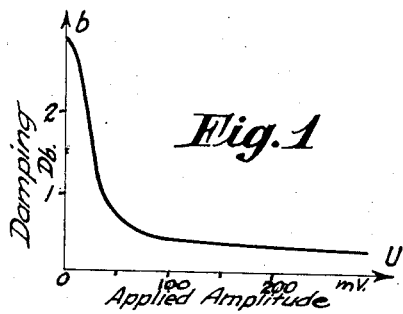
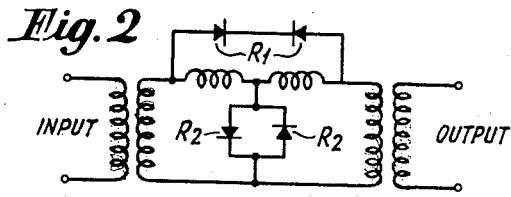
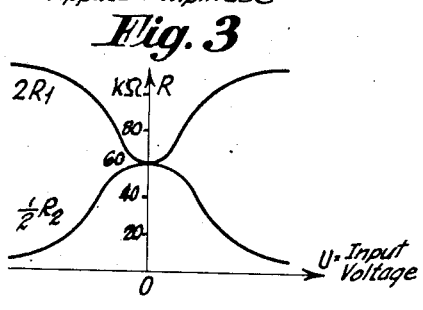
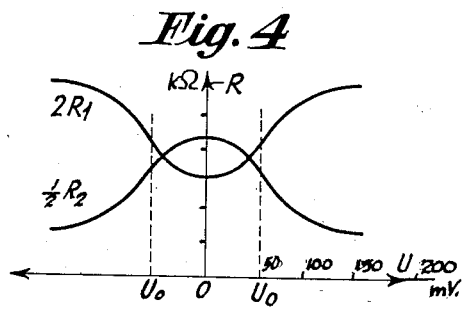
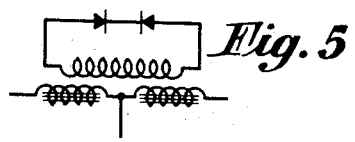
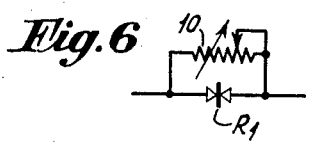
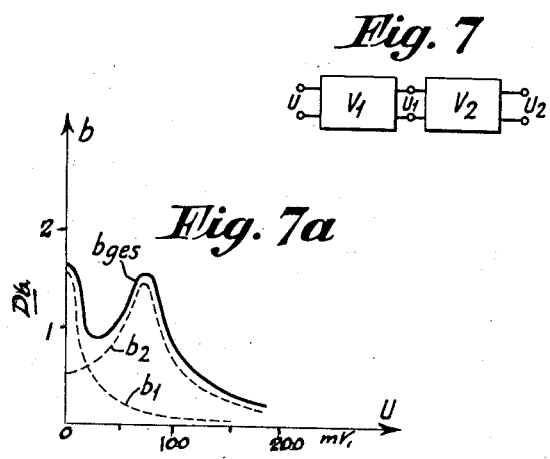
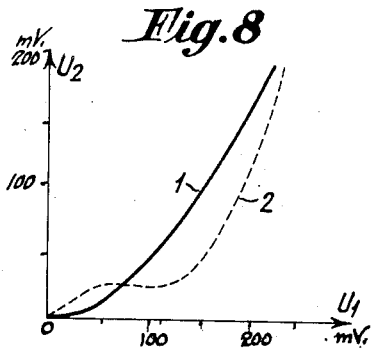
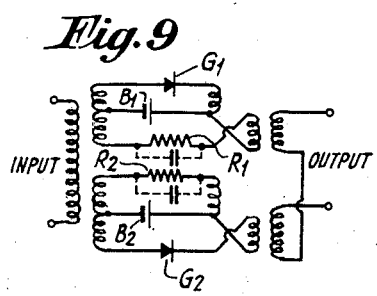
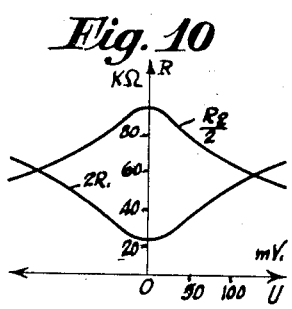
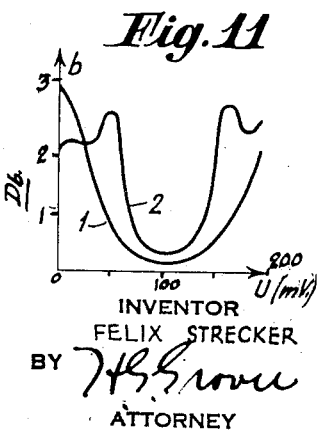
INVENTOR
FELIX STRECKER
BY
ATTORNEY Patented Jan. 17, 1939

2,144,036

UNITED STATES PATENT OFFICE 2,144,036

AMPLITUDE LIMITING DEVICE

Felix Strecker, Berlin-Siemensstadt, Germany, assignor to Siemens & Halske Aktiengesellschaft, Berlin-Siemensstadt, Germany Application September 5, 1936, Serial No. 99,680
In Germany September 17, 1935

1 Claim. (Cl. 178—44)

The present invention relates to a four pole device having non-linear characteristics such as are especially required for the purpose of limiting amplitudes.

For a better understanding of the invention, reference is made to the accompanying drawing, in which:

Fig. 1 shows a damping curve of a device in which the damping decreases as the applied amplitude increases, Fig. 2 is a schematic circuit diagram of a bridge form of limiting device, Figs. 3 and 4 show the damping curves of the arrangement of Fig. 2, Fig. 5 shows the non-linear resistors coupled to a bridge circuit by a transformer, Fig. 6 shows the non-linear resistors of a bridge circuit shunted by a variable resistor, Figs. 7a, 8, 10 and 11 show various damping curves obtainable with devices made according to the invention, Fig. 7 shows two arrangements made according to the invention connected in series, and Fig. 9 is a circuit diagram of a modified form of damping device made according to the invention.

Amplitude limiting means for small and large amplitudes generally have damping characteristics, either continuously increasing or continuously decreasing with the applied wave amplitude. Fig. 1 shows an example of a damping characteristic of such limiting device for small applied amplitudes. Beginning with a rather high value damping b determined by the input potential U=O, the damping curve decreases with an increase in the amplitude. Devices for such amplitude limitation are already known, and it has also been already proposed to employ for this purpose, four-pole devices containing non-linear resistors. However, it was found that for many purposes, the damping curves attainable with such circuits for amplitude limitation are insufficient.

In accordance with the invention, a desired variation of the damping curve is obtained by introducing poles, or maximum values of the damping, at any input voltage differing from zero. As a result of this measure, a particular blocking effect is especially obtained in the undesirable range or ranges of applied voltage. By combining such damping curves, any desired variation of the entire damping curve can be attained.

The invention relates in particular to four-pole devices containing a bridge circuit or any other compensation circuit, for instance a bridged T-circuit. Fig. 2 shows an example of a limiting circuit having the form of a bridged T-member and in which the non-linear elements consist of symmetrically arranged non-linear resistors. The following effects are obtained when applying the invention to such circuit.

The functioning of this circuit is represented in Figures 3 and 4. Herein U represents the voltage at the input of the combination, the resistances R are plotted on the ordinate axis in kilohms ($k\Omega$). If the differential transformer is an ideal one, the circuit represented, acts in the manner of a bridge circuit having the resistors $2R_1$ and $1/2R_2$. If the circuit is to be utilized for the the suppression of small amplitudes, a condition of equilibrium is to be attained for low voltages, so that there must be the relation $2R_1=1/2R_2$. For larger amplitudes of the voltage U at the input potential, deviations will be produced in the mean resistance, so that the damping of the member decreases. In fulfilling this condition there will be obtained as previously pointed out, a damping curve formed according to Fig. 1.

Now if, in accordance with the invention, the non-linear resistors in the series and parallel branches are suitably dimensioned such as indicated in Fig. 4, the mean resistance for both combinations is different for very low voltages U. For the amplitude $U_0$ however, the mean resistances for the fundamental wave will be almost the same. In case of high voltages the differences of the resistances assume rapidly very considerable values, so that the damping decreases rapidly. Hence, a maximum of the damping will be reached at a finite value of the amplitude which differs from zero.

In the example shown, as non-linear resistors, especially dry rectifiers, such as copper oxide rectifiers are to be considered. However, the subject matter of the invention is not limited thereto, since other non-linear resistors such as hot-conductors etc. can likewise be used. The non-linear resistors may be suitably dimensioned for instance by means of transformers such as shown in Fig. 5. As indicated in Fig. 6, in addition to the individual non-linear resistors, a parallel resistor 10 may also be used. For this resistor the variable type may be used in particular.

By different dimensioning of the circuit, an entire series of damping curves can be produced having the maximum values at various voltages. In combining several such curves, any desired variation of the damping can be obtained, such as indicated in Fig. 7. This figure shows two four-pole devices $V_1$ and $V_2$ dimensioned in accordance with the invention and connected in series. If there exists a voltage U at the input of the first of these four-pole devices, then after passing the four-pole device $V_1$ the value of this voltage will be $U_1$. This voltage will now be applied to the four-pole device $V_2$ so that an output voltage $U_2$ of the entire arrangement will be obtained. In the corresponding damping-voltage curves in Fig. 7a, $b_1$ and $b_2$ are the damping curves of the four-pole devices. In connecting these two four-poles in series there will be obtained a variation of the damping curve such as schematically indicated by the curve $b_{ges}$. It should be borne in mind that in case of this series connection the sequence of the four-pole devices plays a certain role. It will be seen that the entire damping curve will be a different one since a voltage different from the original voltage is applied to the second four-pole device.

By means of such damping curves in which a maximum of the damping is attained at a finite value of the amplitude, a sharp distinction between the amplitudes to be blocked and those which are left to pass, will be obtained. In connection with the dimensioning, it should furthermore be considered that the output amplitude at a decrease of the input voltage also decreases when the damping is constant. From this, it can be concluded that it is not always necessary to provide an especially great weakening of the very small amplitudes.

A damping curve of certain arrangements such as is shown in Fig. 1 presents a relationship between the output potential and the input potential such as is indicated for instance by curve 1 of Fig. 8. The dimensioning according to the invention of the non-linear resistors furnishes however, when based upon a damping curve such as obtained in the example of Fig. 7, a variation of the curve as represented by 2 in Fig. 8. While in the curve 1 there does not exist a distinct threshold value, a region of distinctly low output potential is now obtained by the use of non-linear resistors entering into a region of great steepness. Hence by means of the invention, a threshold value is produced and a relative steepening of the dampening increase can be attained.

As previously stated, the invention is not limited to bridged T-circuits but encompasses also all other limiting circuits in which a so-called compensation circuit is present. An example of another limiting circuit is represented in Fig. 9. Herein, the matching resistors $R_1$ and $R_2$ serve for matching the resistance values of the non-linear resistors $G_1$ and $G_2$ for a definite amplitude. At this place a damping pole is then obtained with respect to the fundamental wave i. e. practically a region of maximum damping. Also in this case, it is possible to vary the damping curves by varying the biasing potentials of the batteries $B_1$ and $B_2$ by varying the resistors $R_1$ and $R_2$, or the surface in the copper oxide rectifiers.

The explanations relating to the example shown in Fig. 4 refer to limiting means intended to reduce small amplitudes. Equivalent reasoning can also be made in connection with the limiting means for large amplitudes. Also in case of the last mentioned limiting means, circuits according to the diagrams presented, such as for instance according to Fig. 2 can be employed. The matching of the resistors $2R_1$ and $1/2R_2$ is then carried out in accordance with the large amplitudes so that the greatest difference exists in case of the small amplitudes. Also in this case, the damping curves are made to intersect each other as indicated in Fig. 10. The resistances in case of large amplitudes will then be relatively the same and in case of small amplitudes they are greatly different from each other. In this way, damping curves are obtained corresponding to those in Fig. 7a, in which the dampings increase simply in accordance with the high voltage values.

Having described my invention, what I claim as new and desire to secure by Letters Patent is:

Means for damping a wave of variable amplitude comprising a lead, a circuit including two inductors connected in series across the ends of said lead, two oppositely disposed non-linear resistors connected in series across the outer ends of said inductors, and a pair of non-linear resistors oppositely disposed in shunt relation and connected between said lead and the common terminal of said inductors.

FELIX STRECKER.